(12) United States Patent
Widemann

(10) Patent No.: US 6,364,212 B1
(45) Date of Patent: Apr. 2, 2002

(54) HEATING DEVICE

(75) Inventor: Fritz Widemann, München (DE)

(73) Assignee: Webasto Thermosysteme GmbH, Stockdrof (DE)

( * ) Notice: Subject to any disclaimer, the term of this patent is extended or adjusted under 35 U.S.C. 154(b) by 0 days.

(21) Appl. No.: 09/424,228

(22) PCT Filed: Jun. 3, 1998

(86) PCT No.: PCT/EP98/03311

§ 371 Date: Nov. 26, 1999

§ 102(e) Date: Nov. 26, 1999

(87) PCT Pub. No.: WO98/56607

PCT Pub. Date: Dec. 17, 1998

(30) Foreign Application Priority Data

Jun. 11, 1997 (DE) ........................... 197 24 502

(51) Int. Cl.⁷ .................................................. B60H 1/02
(52) U.S. Cl. ............................... 237/12.3 C; 431/114
(58) Field of Search ....................... 237/12.3 C, 12.3 R, 237/2 A; 431/114, 89, 12

(56) References Cited

U.S. PATENT DOCUMENTS 4,543,055 A * 9/1985 Tilly ........................... 431/12
4,976,463 A * 12/1990 Soo ............................. 237/8 C
5,456,408 A * 10/1995 Appel ......................... 237/2 A
5,564,627 A * 10/1996 Veitenhansl ............. 237/123 B

FOREIGN PATENT DOCUMENTS

| DE | 21 60 086 A | * | 9/1972 |
| DE | 30 25 283 A | * | 2/1982 |
| DE | 44 15 513 A | * | 9/1994 |
| DE | 195 26 003 A | * | 2/1996 |
| DE | 196 19 861 A | * | 11/1997 |
| EP | 0 133 349 A | * | 8/1987 |

* cited by examiner

Primary Examiner—Harold Joyce
Assistant Examiner—Derek S. Boles
(74) Attorney, Agent, or Firm—Nixon Peabody LLP; David S. Safran

(57) ABSTRACT

The invention relates to a heating device, especially for a motor vehicle, with a burner, to which fuel is supplied from a tank via a fuel line by means of a pump, especially a piston pump, and with an electronically controllable valve means which is inserted into the fuel line and which can be controlled by a control means. To ensure problem-free feed of fuel to the burner independently of the pump pressure, a pressure reservoir is assigned to the valve means, fuel being delivered by means of the pump controlled in a clocked manner by the control unit, to the pressure reservoir and from the latter to the burner, without the action of the pump.

10 Claims, 2 Drawing Sheets

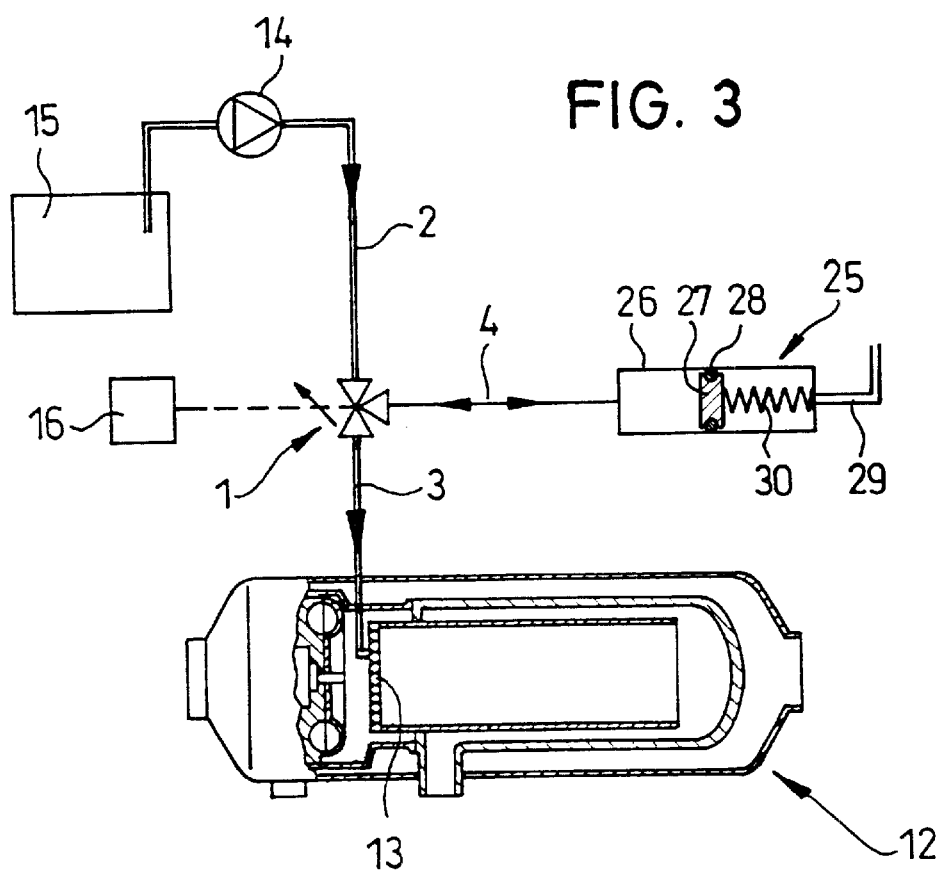

HEATING DEVICE

BACKGROUND OF THE INVENTION

1. Field of the Invention

The invention relates to a heating device, especially for a motor vehicle, with a burner, to which fuel is supplied from a tank via a fuel line and a pressure reservoir by means of a pump, especially a piston pump, and with an electronically controllable valve means which is inserted into the fuel line and which can be controlled by a control means.

2. Description of the Related Art

A generic prior art heating device is known from the German patent application DE 196 19 861 A1. In this reference, the pressure reservoir is located in the flow path between the pump and the valve means so that the valve means is not able to control charging of the pressure reservoir.

Mainly mechanical or electrically driven piston pumps are used to supply fuel to heating devices. One exception is a high pressure burner. When used to deliver heat, known piston pumps have the disadvantage that the do not work reliably with pressure of roughly 3 bar or more prevailing in the flow pipe. When the fuel is metered via nozzles according to one known proposal, large, uncertain and expensive pressure reducers must be used. Air enters the fuel due to the volumetric delivery and causes problems in the fuel system.

To overcome the latter mentioned defect, for the heating device known from DE 195 26 003 A1, placing a solenoid valve in the fuel line to the burner is proposed. This solenoid valve forms a choke point in the fuel line which offers a considerable resistance to the flowing fuel which increases in excess proportion as the amount of flow increases, while this choke point offers only very little resistance to air or gas or steam. In interaction with a pressure-controlled fuel pump a state is achieved in this way in which problems in the fuel system due to gas bubbles or the like are prevented. The solenoid valve is triggered according to the required burner performance with a defined frequency which corresponds to the stroke frequency of the pump. But this measure does not ensure that the pump will operate reliably at high flow pipe pressures. A similar heating device is known from DE-A1-30 25 283.

DE-A1-21 60 086 discloses inserting into a line between the oil tank and a burner on the pressure side of a pump, a valve which is connected to a chamber which is designed that in the burner line at a certain time, a lower pressure is produced in order to suck bask a certain excess amount of oil from the butner line mouth.

SUMMARY OF THE INVENTION

The object of this invention is to devise a heating device which, independently of the pressure made available by the pump, ensures reliable delivery of fuel to the burner.

The invention calls for a combination of the valve means with a pressure reservoir which is used as a buffer and storage reservoir for the fuel which is delivered by a preliminary feed pump (which is part of the motor vehicle or for auxiliary heating by an additional preliminary feed pump of any design) to a downstream burner with a pressure which is fixed by the construction of the pressure reservoir and which is compatible with the downstream burner. This means that the intermittent feed of fuel which has been conventional to date by means of a solenoid valve from the piston pump to the burner is replaced by intermediate storage of fuel in the pressure reservoir and fuel delivery to the burner is exclusively from this intermediate storage. This ensures that the delivery of fuel to the burner is completely independent of the delivery pressure upstream of the valve means so that neither pressure fluctuations from the pump nor an overly high pressure generated by this pump have an adverse effect on the burner function.

To reliably prevent penetration of the pump pressure fluctuations to the burner, it is advantageously provided that only one of the two paths of the valve means, controlled by the control unit, is open at a time specifically, either the first path from the pump into the pressure reservoir in opened or the second path from the pressure reservoir to the burner is opened.

The paths are is controlled in an especially preferred manner such that the first path is closed before the second path is opened. Instead of the latter mentioned measure, the switchover times of the valve means can be kept so short by the corresponding rating of the magnet forces and spring forces thereof, that penetration of the pump to the burner is prevented.

The valve means can basically be designed differently. One preferred embodiment of the valve means is a three-way/two-way solenoid valve or a two-way slide valve for control of the two upstream and downstream flow paths. Alternatively, this two-way valve can also be replaced by a pair of individual valves. Basically, the use of a three-way valve which is controlled accordingly such that penetration from the pump to the burner is prevented is also considered.

To achieve as uniform an amount of delivery over a pressure range which is as wide possible, it is advantageously provided that the pressure reservoir has a soft spring characteristic with a hard limitation can be achieved for example, by using in the pressure reservoir as the storage element with two metal membranes which make contact with one another when the maximum pressure is reached. But also, any other pressure reservoir can be used, such as for example, pistons sealed by sealing lips or roll membranes.

According to one other advantageous development of the invention, the valve means is designed such that in the flowless state, it clears the first flow path from the pump into the pressure reservoir, while it blocks the second flow path from the pressure reservoir to the burner.

In the following the invention is detailed using the drawings.

BRIEF DESCRIPTION OF THE DRAWINGS

FIG. 2 shows a curve representation of the spring characteristic of the pressure reservoir and FIG. 3 shows a version of FIG. 1.

DETAILED DESCRIPTION OF THE INVENTION

Figure 1:
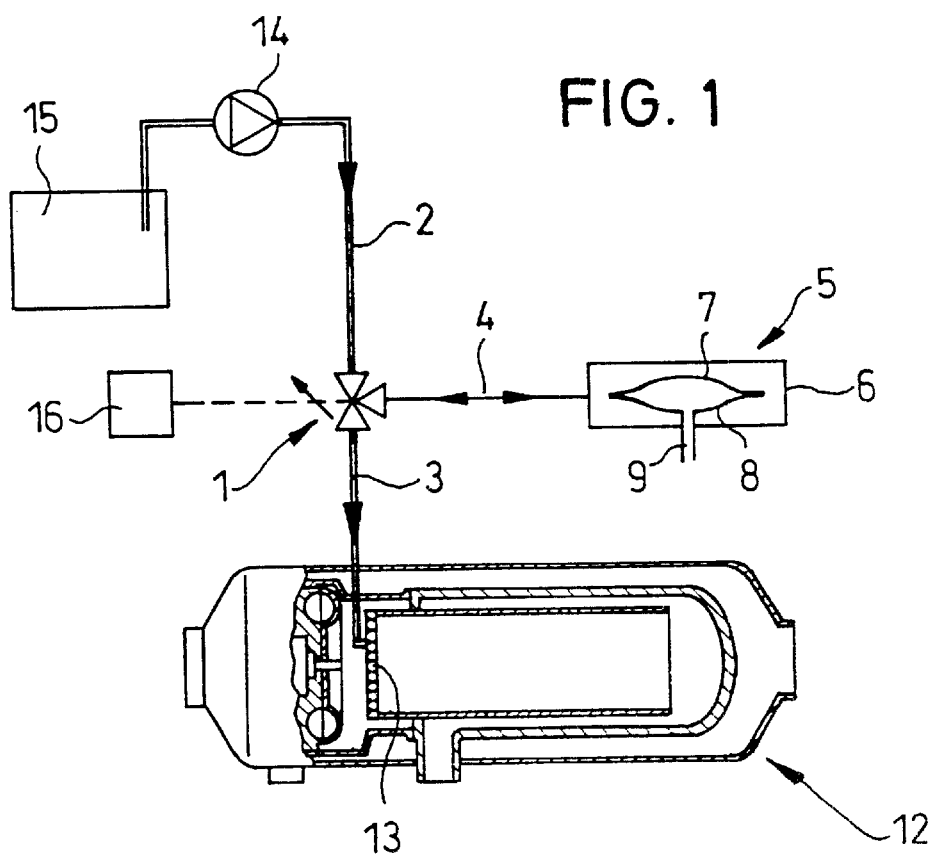
FIG. 1 schematically shows the combination of the valve means and pressure reservoir for a heating device as claimed in the invention.

FIG. 1 shows the part important for the invention in incoming flow to the heating device 12 in the area of the valve means 1 which is located in a fuel line which leads from a fuel tank 15 to the schematically shown burner 13 of the heating device 12. Referenced to the valve means 1, the fuel line consists of a upstream line part 2 and a downstream line part 3. The flow direction of the fuel in the fuel line is shown in FIG. 1 by the arrows. In the upstream line part 2, there is a pump 14, especially a piston pump for feed of fuel in the line 2. In the embodiment shown, the valve means 1 is formed as a three-way valve, and the third way of this valve is connected via a line 4 to a pressure reservoir 5. The pressure reservoir 5 in the embodiment shown, a housing 6 into which the line 4 discharges and the pressure reservoir element which is located in the housing 6, and of two metal membranes 7 and 8 which are tightly connected to one another on the edge side, and surround a cavity which is connected to the outside of the housing 6 via a pipe 9 or the like. As indicated by the double arrow in the line 4, flow of fuel through this line 4 takes place alternatively in one of two directions.

FIG. 1 shows how the combination of the valve means 1 and the pressure reservoir 5 works.

In the flowless state of the valve means 1 the first flow path through the valve means 1 is open and includes the upstream fuel line part 2 and the line 4 and provides for conveyance of fuel from the pump into the pressure reservoir 5. A second flow path including the downstream fuel line part 3 is conversely closed in the flowless state of the valve means 1 so that fuel is conveyed solely into the pressure reservoir 5. In this case, during delivery, the pressure in the pressure reservoir rises and in this, way increasingly presses the two metal membranes 7 and 8 against one another. In this case, the cavity surrounded by the membrane 7 and 8 is diminished and the air contained in this cavity reaches the atmosphere via the pipe 9. After a stipulated time interval has expired which is determined by the control unit 16 which controls the valve means 1, the valve means 1 switches over such that the first flow path is closed and the second flow path comprising the line 4 and the fuel line part 3 is opened. The fuel which is stored under pressure in the housing 6 of the pressure reservoir 5 is now delivered to the burner 13 via the second flow path comprising 3 and 4. In this process, the cavity enclosed by the membranes 7 and 8 expands, outside air flowing in via the connection 9. After the end of this conveyance process via the second flow path, the valve means 1 is again switched over such that delivery takes place via the first flow path, etc.

Figure 2:
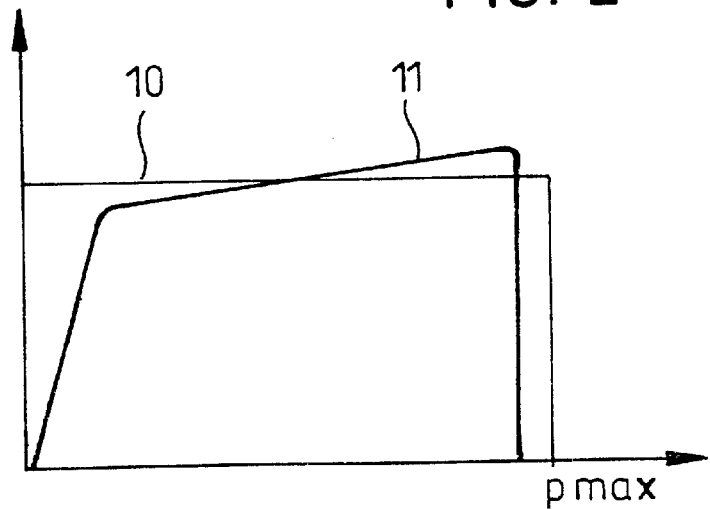

It is important that the pressure reservoir 5 has a soft spring characteristic which is hard limited, such as by the two metal membranes 7 and 8 coming into contact with one another as soon as the pressure reservoir 5 is maximally filled with fuel. FIG. 2 shows the desired optimum spring characteristic which is labelled with reference number 10 and is shown in the diagram, on the y-axis of which the volume in the housing 6 is plotted, while the x-axis plots the fuel pressure in the housing 6. Reference number 11 labels the actually attainable spring characteristic which in contrast to the ideal spring characteristic with a vertical leading edge, has a steeply ascending part which passes into a flatly ascending part and then suddenly, similarly to the ideal spring characteristic 10, at maximum pressure peaks, since in this case the two membranes 7 and 8 come into contact with one another.

In FIG. 3, a pressure reservoir 25 is surrounded by a preferably cylindrical housing 26 into which on the face, a line 4 discharges and which on the opposite face, is provided with a pipe 29 for venting. In the housing 26, a piston 27 is supported to move axially and is sealed relative to the inner jacket surface of the housing 26 by means of a seal 28 which can be made, for example, in the form of a lip seal with several successive sealing lips, or in the form of a roll membrane seal.

The piston 27 is pressurized by a spring 30 on the back side facing the pipe 29. The spring 30 can be composed of several spring elements in order to achieve the soft spring characteristic shown in FIG. 2 with a hard stop. The space facing the line 4 on the front of the piston 27 is used to store the liquid fuel.

The preliminary feed pump 14 can be formed both by a pump which is part of the motor vehicle and which delivers fuel to the internal combustion engine of the motor vehicle, and also by a separate pump assigned to the heating device 12 when using the heating device 12 for preheating (when the internal combustion engine is not in operation).

What is claimed is:

1. Heating device comprising:

a burner;

a pressure reservoir;

a pump for providing fuel from a tank to said pressure reservoir, said pressure reservoir being connected to said burner via an electronically controllable valve unit for controlling a flow of fuel in said heating device in two flow paths, a first path being from said pump into said pressure reservoir, and a second path being from said pressure reservoir to said burner; and a control unit for controlling the operation of said valve unit in a timed manner so that fuel flows in only one of said first path and said second path at any given time.

2. Heating device of claim 1, wherein said control unit controls said valve unit to close said first path before opening said second path.

3. Heating device of claim 1, wherein said valve unit includes at least one of a multipath solenoid valve and a plurality of solenoid valves to control flow of fuel in said first path and said second path.

4. Heating device of claim 1, wherein said valve unit includes at least one of a two-way slide valve and a plurality of slide valves, adapted to establish said first path and said second path.

5. Heating device of claim 1, wherein said pressure reservoir has a soft spring means for receiving and pressurizing fuel in said reservoir, said soft spring means including a hard limitation means for limiting the amount of fuel received in said pressure reservoir.

6. Heating device of claim 5, wherein said soft spring means includes two metal membranes located in a housing connected to said valve unit, said two metal membranes being adapted to adjoin one another when a maximum pressure is reached, thereby limiting the amount of fuel received in said pressure reservoir.

7. Heating device of claim 5, wherein said soft spring means includes a piston which is biased by a spring.

8. Heating device of claim 1, wherein said pump is operable independently of a drive of a motor vehicle.

9. Heating device of claim 8, wherein said tank is a fuel tank of the motor vehicle.

10. Heating device of claim 1, wherein said tank is a fuel tank of a motor vehicle.

* * * * *